United States Patent
Newton et al.

[11] 3,862,990
[45] Jan. 28, 1975

[54] BIPHENYL SULFONES

[75] Inventors: Alan Branford Newton, Enfield;
John Brewster Rose, Letchworth;
Victor Jeffrey Leslie, Potters Bar, all
of England

[73] Assignee: Imperial Chemical Industries Limited, London, England

[22] Filed: June 29, 1973

[21] Appl. No.: 374,977

Related U.S. Application Data

[60] Division of Ser. No. 186,795, Oct. 5, 1971, Pat. No. 3,764,583, which is a continuation-in-part of Ser. No. 60,101, July 31, 1970, abandoned.

[30] Foreign Application Priority Data
July 31, 1969 Great Britain ............... 38438/69

[52] U.S. Cl. ............................. 260/607 A
[51] Int. Cl. ............................. C07c 147/10
[58] Field of Search ...................... 260/607 A

[56] References Cited
UNITED STATES PATENTS
3,764,583  10/1973  Newton et al. .......... 260/607 A

*Primary Examiner*—Lewis Gotts
*Assistant Examiner*—D. R. Phillips
*Attorney, Agent, or Firm*—Cushman, Darby & Cushman

[57] ABSTRACT

A halophenol of the formula

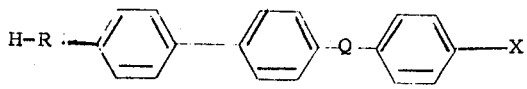

where X is a halogen atom, R is —O— or —S— and Q is —CO— or —SO$_2$—, or an alkali metal salt thereof. These products may be used to make aromatic polymers comprising units of the formula

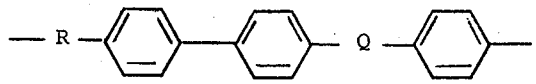

and copolymers comprising such units and other units such as

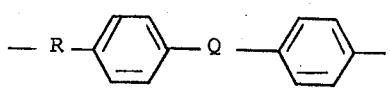

which are of higher softening point than polymers of the latter units alone.

3 Claims, No Drawings

BIPHENYL SULFONES

This is a division of application Ser. No. 186,795, filed Oct. 5, 1971, which is a continuation-in-part of Ser. No. 60,101, filed July 31, 1970, now abandoned, said Ser. No. 186,795 is now U.S. Pat. No. 3,764,583, issued Oct. 9, 1973.

This invention relates to new aromatic polymers and to new chemical intermediates from which they may be produced.

In the specifications of British Patents Nos. 1,153,035 1,153,528 and 1,234,301, the disclosures of which are incorporated herein by reference, there are described methods for the production of aromatic polymers in which a dihalobenzenoid compound having each halogen atom activated by an electron-attracting group is caused to react with a substantially equivalent amount of an alkali metal hydroxide. The dihalobenzenoid compound may, in particular, have the formula

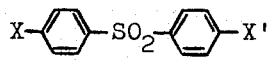

or 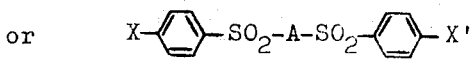

where X and X' are halogen atoms (preferably chlorine or fluorine) and A is a bivalent aromatic radical of, for example, benzene, naphthalene or biphenyl. Also described therein and in British specification 1,177,183 (the disclosure of which is incorporated herein by reference) is the production of aromatic polymers whose molecular chains comprise units of the formula

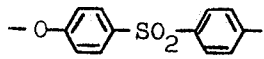

in which an alkali metal salt of a halophenol of the formula

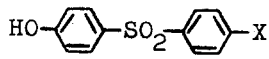

(wherein X is halogen) is polymerised by the displacement of alkali metal halide.

British specification No. 1,177,183 describes polymers having recurring units of the formula —O—E— in which E is the residuum of a halophenol, i.e. the bivalent aromatic residue of the compound after removal of the halogen atom and aromatic hydroxyl group from the halophenol. Any halophenol may be used provided that the halogen atom is bonded to a benzene ring having an electron-withdrawing group in at least one of the positions ortho or para to the halogen atom. The halophenol can be either mononuclear where the halogen atom and hydroxyl group are attached to the same benzene ring or polynuclear where they are attached to different benzene rings, provided that there is the electron-withdrawing group in the ortho or para position of the benzene ring containing the halogen atom.

Any electron-withdrawing group can be employed as the activator group in the halophenols. It should be, of course, inert to the reaction, but otherwise its structure is not critical. Preferred are the strong activating groups for example the sulphone group ($-SO_2-$) bonding two benzene rings as in 4-(4-chlorophenylsulphonyl) phenol and 4-(4-fluorophenylsulphonyl)-phenol, although such other strong withdrawing groups hereinafter mentioned can also be used.

The more powerful of the electron-withdrawing groups give the fastest reactions and hence are preferred. It is further preferred that the ring contains no electron supplying groups on the same benzene ring as the halogen; however, the presence of other groups on the ring or in the residuum of the halophenol can be tolerated. Preferably, all of the substituents on the halophenol residuum are either hydrogen (zero electron-withdrawing), or other groups having a positive sigma* value, as set forth in J. F. Bunnett in Chem. Rev., 49, 273 (1951) and Quart. Rev., 12, 1 (1958).

The electron-withdrawing group of the halophenol compound can function either through the resonance of the aromatic ring, as indicated by those groups having a high sigma* value, i.e. above about +0.7 or by induction as in perfluoro compounds and other electron sinks.

Preferably the activating group should have a high sigma* value, preferably above 1.0, although sufficient activity to promote the reaction is evidenced in those groups having a sigma value above 0.7, although the reaction rate with such a low powered electron-withdrawing group may be somewhat low.

The activating group can be basically either of two types:

a. monovalent groups that activate displacement of a halogen on the same ring as the aromatic hydroxy group for example a nitro group, phenylsulphone, phenylcarbonyl, alkylsulphone, cyano, trifluoromethyl, nitroso and hetero nitrogen as in pyridine, b. divalent groups that activate displacement of a halogen on a ring joined by the divalent group to a ring having the aromatic hydroxyl group, for example the sulphone group $-SO_2-$; the carbonyl group $-CO-$; the vinyl group $-CH=CH-$; the sulphoxide group $-SO-$; the azo group $-N=N-$; the saturated fluorocarbon groups $-CF_2 CF_2-$; organic phosphine oxides $+PO(R'')+$, where R'' is a hydrocarbon and the ethylidene group $+C(CX_2)+$ where X can be hydrogen or halogen, or divalent groups which can activate a halogen on the same ring as the aromatic hydroxyl group for example difluorobenzoquinone, 1,4- or 1,5- or 1,8-difluoroanthraquinone.

If desired, the polymers may be made with mixtures of two or more halophenols having substantially the same reactivities which may have different or the same electron-withdrawing groups. Thus the E residuum of the halophenols in the polymer structure may be the same or different.

In British specifications 1 078 234 and 1 133 561 (the disclosures of which are included herein by reference), there is disclosed a method for the production of aromatic polymers having recurring units of the formula $-O-E'-O-E^{\circ}-$ in which a dihalobenzenoid compound having each halogen atom activated by an electron-attracting group (as described above) is caused to react with a di-(alkali metal) salt of a dihydric phenol in the liquid phase of an inert highly polar organic solvent. In this formula E' is thus the residue of the dihydric phenol and E° is the residue of the dihalobenzenoid compound. The dihalobenzenoid compound may in particular have the formula

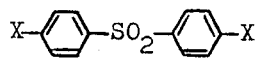

(where X is halogen, preferably chlorine or fluorine) and the dihydric phenol may in particular be one of the following:

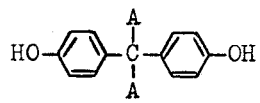

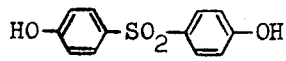

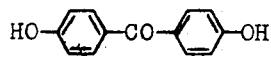

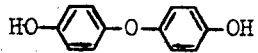

(where the A group represents hydrogen, lower alkyl, lower aryl and the halogen-substituted groups thereof).

According to the present invention there are provided new aromatic polymers whose molecular chains comprise units of the formula

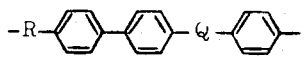

in which R is —S— or —O— and Q is —SO$_2$— or —CO— and each may differ from unit to unit in the polymer chain either alone or copolymerised with other units, and in particular with units of the formula —R—E— and/or units of the formula —R—E'——R—E° in which formulae Q, R, E, E' and E° are as defined above. Polymers containing a substantial proportion of units of the former formula (e.g. 10 of the former units for 90 of the latter in the polymer) are of higher softening point than equivalent polymers having units of the latter formula alone, and a useful modification of the properties of the latter polymer may be obtained by the presence of as little as 1 of the former units for 99 of the latter in the polymer.

According to the invention there are also provided as new chemical intermediates halophenols of the formula

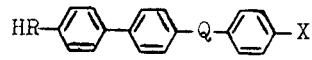

(where X is halogen) and their alkali metal salts.

These halophenols or halothiophenols, possessing a reactive halogen atom as well as a phenolic group, can serve as valuable chemical intermediates for producing a variety of products; for example the halogen atom can be replaced by amino and substituted amino groups or by oxygen- or sulphur-containing anions to produce amines, ethers and sulphides.

The halophenols or halothiophenols of the invention may be made by one of the reaction sequences outlined below, as appropriate.

1. 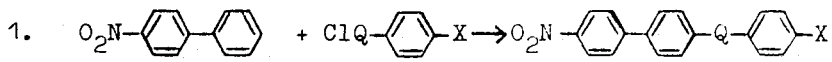

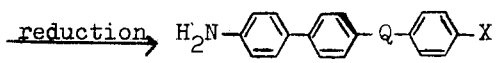

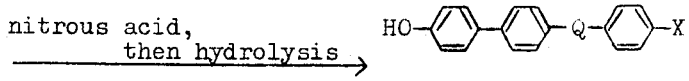

2. 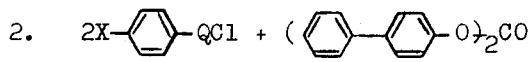

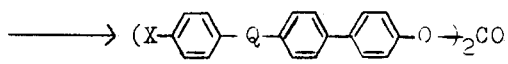

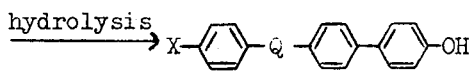

3. 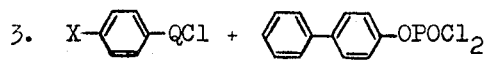

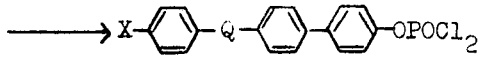

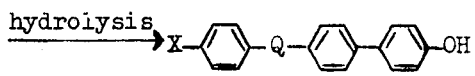

4. 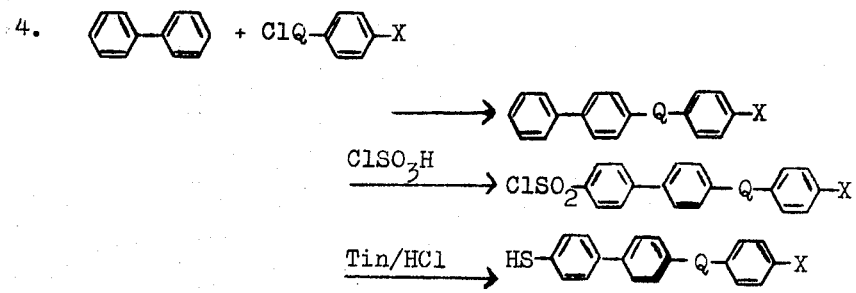

5. 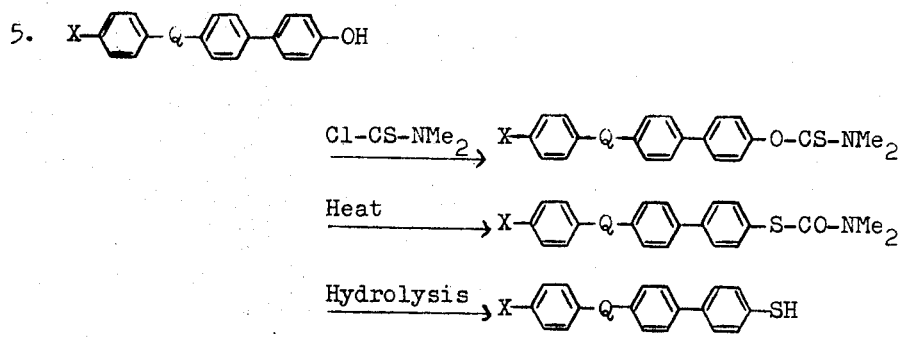

The halophenol or halothiophenol can be converted into an alkali metal salt by treatment with a suitable base (e.g. an alkali metal hydroxide or alkoxide).

The alkali metal salts of the halophenols polymerise at 150°–400°C by the displacement of alkali metal halide to give polymers according to the invention having units of the formula

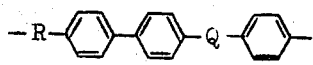

They may be polymerised alone; or they may be copolymerised with alkali metal salts of other activated halophenols or halothiophenols (or with mixtures of activated dihalobenzenoid compounds and an equivalent amount of alkali metal hydroxide, sulphide or hydrosulphide and in particular with alkali metal salts of halophenols of the formula

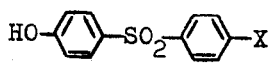

as described in British specification Nos. 1,153,035 and 1,177,183; or they may be copolymerised with mixtures of alkali metal salts of dihydric phenols or thiophenols and activated dihalobenzenoid compounds as described in British specification Nos. 1,078,234, 1,133,561, 1,124,200 and U.S. Pat. No. 3,432,468. The halogen atoms in the halophenol or dihalobenzenoid compound are activated by electron-attracting groups such as —SO$_2$— ortho or para to the halogen atom.

In a further embodiment of the invention, block copolymers may be formed by polymerising an alkali metal salt of a halophenol of the formula

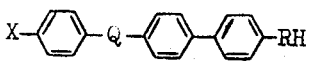

in the presence of preformed polymers comprising benzenoid groups and oxygen or sulphur atoms in the polymer chain, with bivalent electron-attracting groups such as —SO$_2$— or —CO— also in the polymer chain separated from an oxygen or sulphur atom by a para or ortho phenylene group, such as for example those described in British specification Nos. 1,078,234 and 1,153,035 and U.S. Pat. No. 3,432,468. Preferred preformed polymers are those having repeating units

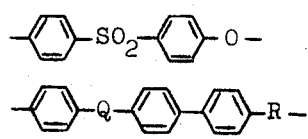

(where the combination of Q and R is different from that of the polymerisable halophenol above)

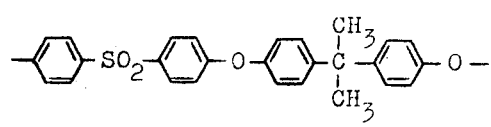

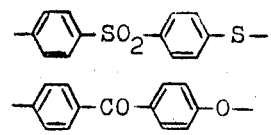

either alone or copolymerised with each other and/or up to 80% of units having the formula

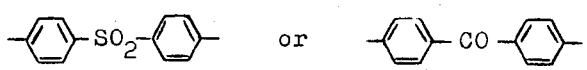

Where R is an oxygen atom the halogen atoms are preferably chlorine or fluorine. The fluorine derivatives generally are more reactive and enable the displacement of alkali metal halide to be carried out more quickly or at a lower temperature, but are more expensive. Bromine derivatives are also relatively expensive and although they resemble the chlorine derivatives in performance they offer no advantages. Iodine derivatives are generally less suitable.

However, when R is a sulphur atom, the halogen atom, X, is preferably chlorine or bromine. Fluorine derivatives are generally less suitable.

The alkali metal is conveniently potassium or sodium. Displacement of alkali metal halide often occurs more readily if the potassium cation is present in the reagent used, but the weight (and usually the price) per mole of a potassium compound is higher than for the corresponding sodium compound. Some or all of the alkali metal cation in the reagent may be replaced by an organic onium cation having a positively charged hetero-atom (for example a quaternary ammonium cation such as tetramethyl-ammonium) stable under the conditions of the reaction, and the term "alkali metal salt" as used herein is deemed to refer also to salts containing such onium cations.

The polymerisation may be carried out in the melt but is preferably carried out in a polar liquid which is a solvent for the resultant polymer and preferably also for the polymerisable starting materials and which is stable under the reaction conditions employed.

Suitable polar liquids for the reaction include: the lower dialkyl and cyclic alkylene sulphoxides and sulphones (e.g. dimethyl sulphoxide and 1,1-dioxothiolan), nitriles (e.g. benzonitrile), diaryl ketones (e.g. benzophenone), diaryl sulphoxides and sulphones, ethers (e.g dioxane, diethylene glycol dimethyl ether, diphenyl ether, methoxyphenyl ethers) and non-olefinic tertiary alcohols (e.g. t-butanol). Mixtures of such substances may conveniently be used, e.g. when one or more components of the mixture would otherwise be solid at the reaction temperature. The amount of the liquid used is desirably sufficient to ensure that none of the starting materials is in the solid state in the reaction mixture but not so large as to be economically disadvantageous.

For example, diemthyl sulphoxide is a convenient solvent but cannot be used as such high temperatures as 1,1-dioxothiolan (cylic tetramethylene sulphone).

The liquid reaction medium need not contain any solvent for polymer of high molecular weight even at the later stages of the reaction, although if it does not the product is of relatively low molecular weight unless the final stage of polymerisation is carried out in the melt; this may be explained if the molecular chains of the polymer cease to grow in the solid state.

If the polymerisation reaction is carried out in the presence of a diluent, the reaction mixture may become solid as the polymeric product becomes insoluble. Since this may lead to non-uniform polymerisation reaction, it is desirable to maintain the product in solution by for example raising the temperature as the polymerisation proceeds.

The alkali metal salts of the halophenols of the invention having the formula

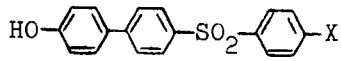

are generally somewhat more reactive than those of the halophenols of the formula

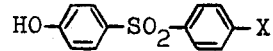

although this increased reactivity is usually insufficient for the polymerisation to be carried out at significantly lower temperatures; i.e. dimethyl sulphoxide is not a suitable solvent unless X is fluorine.

The vessel used should be made of or lined with a material that is inert to alkali metal phenoxides and also to alkali metal halides under the conditions employed. For example, glass is unsuitable as it tends to react with phenoxide anions at high temperatures, upsetting the stoichiometry of the polymerisation and contaminating the product with silicate. Some grades of stainless steel undergo surface crazing at these temperatures in the presence of alkali metal halide, and vessels made of or lined with titanium or nickel or an alloy thereof or some similarly inert material are preferable.

This polymerisation may conveniently be carried out in an extruder or on a heated metal band.

To neutralise any reactive oxygen-containing anions, a reagent therefor may be introduced at the termination of the polymerisation. Reactive monofunctional halides, for example methyl chloride, are particularly suitable.

The alkali metal halide can be removed from the resultant high polymer by any suitable means. For example, it can be extracted from the high polymer using water, or the polymer itself can be dissolved in a strongly polar organic solvent (for example dimethyl formamide, 1-methyl-2-oxopyrrolidine, dimethyl sulphoxide, 1,1-dioxothiolan or nitrobenzene) and then reprecipitated by addition to a liquid such as water which is miscible with the polymer solvent but is itself a non-solvent for the polymer.

When the polymer is formed in solution, a convenient procedure is to add the reaction mixture (which may be decanted or filtered from solid alkali metal halide) to an excess of a liquid which is miscible with the reaction solvent but in which the polymer is insoluble. If the reaction solvent is water-miscible, or is miscible with a liquid in which residual alkali metal halide also dissolves, the polymer can thus be obtained in one step. Otherwise, as for example if the reaction mixture is poured into methanol, the precipitated polymer initially contains alkali metal halide which can subsequently be washed out with water. An alternative procedure is to add to the reaction mixture an inert solvent such as for example bis(4-chlorophenyl) sulphone, bis(4-methylphenyl) sulphone or diphenyl sulphone which is liquid at the reaction temperature but solid at the temperature at which the polymer is subsequently processed. This procedure enables the reaction solvent to be removed by for example distillation under reduced pressure. The resulting hot polymer solution may then be allowed to cool and solidify and after being pulverised the inert solvent and unwanted reaction products may be extracted by washing with for example water, methanol or acetone.

The new aromatic polymers of the invention where Q is $-SO_2-$ may also be made by the polycondensation of a sulphonyl chloride of the formula

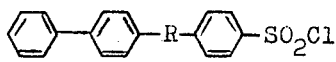

in the presence of a Friedel-Crafts catalyst, and copolymers may be made with other sulphonyl chlorides or mixtures of disulphonyl chlorides and unsubstituted aromatic compounds, for example those of the formulae

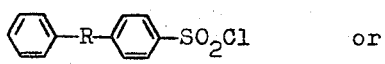

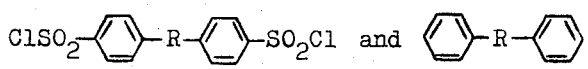

Suitable procedures for such polymerisations are described in British specification Nos. 1,016,245, 1,060,546, 1,109,842 and 1,122,192. Similar procedures relating to the production of polymers containing ketone linking groups are described in British specification Nos. 971,227 and 1,086,021 as well as the above specification 1,016,245.

The reduced viscosity of the polymer is desirably at least 0.3 (measured at 25°C. on a solution of the polymer in a solvent such as diemthyl formamide, N-methyl pyrrolidone or concentrated sulphuric acid containing 1 g of polymer in 100 cm³ of solution, i.e. 1% w/v) if it is to serve for structural purposes as a thermoplastic. In general, the new thermoplastic polymers of this invention may be used in any of the ways described for similar thermoplastic aromatic polysulphones in British specification No. 1,016,245. The polymers containing sulphur linking atoms may be oxidised by for example the process of German specification No. 1,938,806 to form the corresponding polyarylene sulphone. Polymers containing carbonyl linking groups and/or oxidised sulphur linking atoms tend to be more crystalline. Crystalline polymers may be of particular value in the form of film or fibre for use at high temperatures.

The following examples illustrate the invention.

The glass to rubber transition temperatures (Tg) and crystalline melting points (Tm) were determined by differential scanning calorimetry with a Perkin Elmer DSC 1B instrument calibrated by standard melting point substances at a heating rate of 16°C/min. The values of Tm were measured on powdered polymers as prepared at the maximum of the endotherm and do not represent the maximum melting point for any particular copolymer which could be attainable after suitable heat treatment. The endotherms were frequently broad especially where the crystallinity is low, as shown by X-ray methods. The values of TG were measured at the start of the process on all copolymers in the amorphous state. Those that were originally crystalline were first cooled at 64° C/min from above their melting points to obtain them in an amorphous state (unless crystallisation from the melt was too fast).

The Tm and Tg data show the general effect of copolymer composition on the melting and softening characteristics. The melting distribution and Tg values at any coplymer composition can vary with the prior thermal treatment and distribution of comonomer units.

EXAMPLE 1

A stirred melt consisting of 4-chlorobenzenesulphonyl chloride (119 g; 0.55 mole) and 4-nitrobiphenyl (108.5 g; 0.55 mole) was warmed to 100°C, and anhydrous ferric chloride (1 g) was added. The mixture was kept at 100°C for 18 hours until the evolution of hydrogen choloride subsided, during which time the mixture gradually solidified. Methanol (500 cm³) was added, the mass was broken up, and the yellow deposit was filtered off, washed with hot water and dried. Recrystallisation from dimethyl sulphoxide afforded yellow needles of 4-(4-chlorophenylsulphonyl)-4'-nitrobiphenyl, melting point 199°-200°C. The infra-red and nuclear magnetic resonance spectra, and the elemental analysis, were consistent with the structure

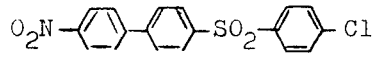

4-(4-chlorophenylsulphonyl)-4'-nitrobiphenyl (59 g; 0.158 mole) was suspended in ethanol (600 cm³) and the solution was stirred and warmed to reflux. A solution of stannous chloride (210 g) in ethanol (600 cm³) was added followed by the dropwise addition of concentrated hydrochloric acid (150 cm³). The mixture was stirred for 3 hours and then poured into an ice/water mixture (2.5 litres). Potassium hydroxide was then added until the mixture was alkaline to litmus, and the colourless slurry which precipitated was filtered off and heated to boiling with a 10% solution of potassium hydroxide for 15 minutes. Filtering, followed by two washes with hot water and finally drying under vacuum gave 4-amino-4'-(4-chlorophenylsulphonyl)biphenyl as a colourless powder. The yield was 54 g (100%) melting point 252°-253°C. The infra-red and nuclear magnetic resonance spectra were consistent with the structure

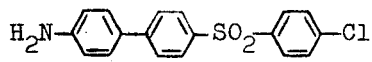

4-amino-4'-(4-chlorophenylsulphonyl)biphenyl (20 g) was dissolved in concentrated sulphuric acid (100 cm³) and the viscous solution was stirred and cooled to 0°C. A solution of potassium nitrite (4.2 g) in concentrated sulphuric acid (100 cm³) was cooled to 0°C, and then added dropwise through a dropping funnel that had its end dipped into the solution. The diazonium salt solution was kept below 5°C, and was added dropwise to a stirred solution of concentrated sulphuric acid (100 cm³) in water (300 cm³) that was heated to 120°C. The precipitate was filtered off, washed twice with water and dried to give 4-(4- chlorophenylsulphonyl)-4'-hydroxybiphenyl, melting point 258°–261°C (with decomposition). On recrystallisation from dimethyl formamide and 1,2-dichloroethane/dimethyl sulphoxide a product of melting point 270°–271°C was obtained. The infra-red and nuclear magnetic resonance spectra were consistent with the structure

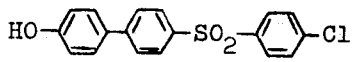

4-(4-chlorophenylsulphonyl)-4'-hydroxybiphenyl (10 g) was suspended in methanol (80 cm³) and the slurry was cooled to 0°C. A solution of 1N methanolic potassium hydroxide (29.1 cm³) was added dropwise and after complete addition the mixture was warmed to 50°C, and then the solvents were removed by evaporation under reduced pressure to give the yellow potassium salt. This salt was dried at 120°C in a vacuum jacket overnight. It could be polymerised in the melt at 310°C.

EXAMPLE 2

A portion of the crystalline 4-(4-chlorophenylsulphonyl)-4'-hydroxybiphenyl (3.45 g), aqueous potassium hydroxide (2.5 cm³ of a 4 N solution) and 1,1-dioxothiolan (20 cm³), were placed in the flask of a rotary evaporator. The resulting mixture was evaporated to dryness under 1 torr pressure and at a temperature rising to 260°C, and the yellow residue was then heated in vacuo for 30 minutes at between 280°C and 320°C. The polymeric reaction product was dissolved in dimethyl formamide, precipitated into methanol and dried to yield polymer (1.9 g) having recurring units of the structure

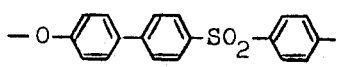

The polymer had a reduced viscosity of 0.52 (measured at 25°C on a solution in dimethyl formamide containing 1 g of polymer in 100 cm³ of solution) and a glass-to-rubber transition temperature of 270°C (measured by differential scanning calorimetry at a heating rate of 16° C/min). Films which could be creased repeatedly without fracture were obtained by compression-moulding the polymer at 350°C and by casting from a concentrated solution of the polymer in dichloromethane.

EXAMPLE 3

The potassium salts of 4-(4-chlorophenylsulphonyl)-4'-hydroxybiphenyl and 4-(4-fluorophenylsulphonyl)-phenol were mixed together in the amounts shown in the table and heated at 300°C for 45 minutes at approximately 1 torr pressure. The products thus obtained were dissolved in dimethyl formamide to give turbide solutions which were filtered and added dropwise into methanol. The copolymers which precipitated were collected, washed with methanol and then dried at 90°C under 14 torr pressure for 24 hours. The copolymers had the reduced viscosities (measured at 25°C on a solution in dimethyl formamide containing 1 g of copolymer in 100 cm³ of solution) shown in Table 1, and they were cast from dimethyl formamide solution to give clear tough films.

TABLE 1

| Monomers | | Copolymer reduced viscosity |
|---|---|---|
| KO—⬡—⬡—SO₂—⬡—Cl | KO—⬡—SO₂—⬡—F | |
| 0.5 g | 1.5 g | 0.61 |
| 1.0 g | 1.0 g | 0.48 |
| 1.5 g | 0.5 g | 0.41 |

EXAMPLE 4

Chlorosulphonic acid (66 cm³; 1.00 mole) was dripped into a stirred solution of 4-(4-chlorophenylsulphonyl) biphenyl (109.5 g; 0.33 mole) in chloroform (250 cm³) during 1.5 hours, whilst hydrogen chloride evolved. The resulting solution was heated at reflux for 3 hours and then allowed to cool. Ice (ca. 100 g) was added to the reaction mixture to give a milky mixture, which was extracted with chloroform. The combined chloroform extracts were dried over anhydrous sodium carbonate then evaporated to an off-white solid which was recrystallised from 1,2-dichloroethylene/petrol (boiling point 80°–100°C) to yield 4-(4-chlorophenylsulphonyl)-4'-chlorosulphonyl biphenyl (78.8 g; 55% of theoretical yield) which had melting point 171°C and infra-red and mass spectra consistent with the structure

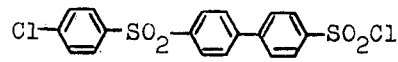

Powdered tin (23.7 g; 0.2 mole) was added to a solution of 4-(4-chlorophenylsulphonyl)-4'-chlorosulphonyl biphenyl (8.54 g; 0.02 mole) in acetic acid (120 cm³). The mixture was heated to reflux and concentrated hydrochloric acid (35 cm³; 0.4 mole) was dripped into it during 2 hours; the resulting mixture was maintained at reflux for a further 2 hours. The reaction mixture was allowed to cool, was diluted with water (ca. 100 cm³) and the solid which precipitated was collected, washed with water, then ethanol and finally petrol (boiling point 40°–60°C) and dried to yield crude 4-(4-chlorophenylsulphonyl)-4'-mercaptobiphenyl.

The crude product was purifed by reprecipitation by hydrochloric acid from aqueous potassium hydroxide solution followed by recrystallistation from 1,2-dichloroethylene/petrol (boiling point 100°–120°C) to yield 4.15 g (58% of theoretical yield) of a white solid which contained carbon 59.9% and hydrogen 3.8% ($C_{18}H_{13}O_2S_2Cl$ requires 59.9%; H 3.6%), and had mass, infra-red and nuclear magnetic resonance spectra consistent with the structure

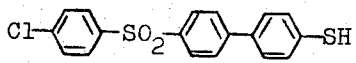

EXAMPLE 5

Aqueous potassium hydroxide solution (3.44 g; 0.03 moles: 114.5 g/mole) was added to a solution under nitrogen of 4-(4-chlorophenylsulphonyl)-4'-mercaptobiphenyl (10.83 g; 0.03 moles) in 1,1-dioxothiolan (15 cm³) which had been degassed by bubbling nitrogen through the solvent for 0.5 hour in a round bottomed flask (capacity 100 cm³) fitted with a stirrer and a Dean and Stark still head. The flask was immersed in an oil bath. Benzene (25 cm³) similarly degassed was then added and water was removed by azeotropic distillation. Benzene was distilled from the flask and then the termperature of the oil bath was raised from 140°C to 200°C. The reaction was continued at this temperature for 3.5 hours and the resulting mixture was macerated with water, washed with boiling water (2 ×400 cm³) and methanol (2 ×300 cm³) and dried. The resulting polymer had repeat units

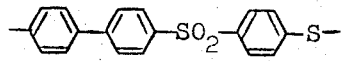

was crystalline with a Tm of 330°C and was compression-moulded at 350°C into a thin, clear amber film.

EXAMPLE 6

Bis-(4-biphenylyl) carbonate (439.2 g; 1.20 mole), 4-chlorobenzenesulphonyl chloride (557.1 g; 2.64 mole), anhydrous ferric chloride (12.0 g; 0.074 mole) and nitrobenzene (600 cm³) were stirred together for 4 hours at 120°C under a stream of nitrogen whilst hydrogen chloride evolved from the reaction mixture. The reaction mixture was allowed to cool and was then diluted with methanol (750 cm³). The solid which precipitated was collected, washed with methanol and dried to yield bis-4-[4-(4-chlorophenylsulphonyl)-biphenylyl] carbonate (725 g)

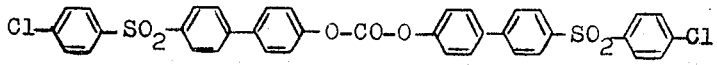

Bis-4-[4-(4-chlorophenylsulphonyl)biphenylyl] carbonate (715.0 g; 1.01 mole), aqueous potassium hydroxide solution (557.3 g; 4.85 mole) and ethanol (2250 cm³) were stirred under reflux for 2.5 hours. The resulting slurry was diluted with methanol until a clear solution was obtained which was added to an excess of a mixture of concentrated hydrochloric acid and water (1:1 $^v/_v$). A precipitate formed which was collected, washed with methanol, dried and recrystallised from aqueous dimethyl formamide to yield 4-(4-chlorophenylsuphonyl)-4'-hydroxybiphenyl (352 g) which had melting point 268°–270°C.

4-(4-chlorophenylsulphonyl)-4'-hydroxybiphenyl (34.45 g; 0.10 mole), anhydrous potassium fluoride (12.20 g; 0.21 mole) and 1,1-dioxothiolan (60 g) were stirred together under nitrogen at 265°C for 18 hours. The resulting viscous solution was cooled to 160°C, diluted with 1,1-dioxothiolan (70 cm³) and saturated with gaseous methyl chloride for 1 hour. The solution was then cooled, diluted with dimethyl formamide until mobile, filtered and then poured into vigorously stirred methanol. The polymer which precipitated was collected, extracted with hot water then hot methanol-acetone mixture (3:2 $^v/_v$) and dried to yield a polymer having repeat units of the structure

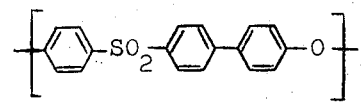

which had reduced viscosity 0.55 (measured as a 1% $^w/_v$ solution in dimethyl formamide at 25°C) and which was extrucded at 380°C to form a pale amber lace.

A sample (35.7 g; 0.05 moles) of bis-4-[4-(4-chlorophenylsulphonyl)biphenylyl] carbonate, aqueous potassium hydroxide solution (22.94 g containing 0.20 moles of potassium hydroxide) and 1,1-dioxothiolan (150 cm³) were charged to a round bottom flask (capacity 1 dm³) equipped with a dry nitrogen inlet, stainless steel stirrer and a vacuum distillation head, condenser and receiver. The flask was pumped with nitrogen, pressure reduced to 1.0 kN/m² (7 mm of mercury) and the temperature of the stirred mixture allowed to rise slowly. As the temperature rose, water distilled from the reaction mixture first, followed by 1,1-dioxothiolan. When about 50 cm³ of 1,1-dioxothiolan had distilled, the pressure within the flask was returned to atmospheric and the temperature increased to 200°C. The mixture was stirred at this temperature for 1.5 hours during which it become more viscous. The mixture was then dripped into vigorously stirred methanol and the polymer which precipitated was collected, extracted three times with boiling methanol-acetone mixture (1:1 volume/volume), twice with boiling water-methanol mixture (1:1 volume/volume) and then dried. The resulting polymer had repeat units of the structure

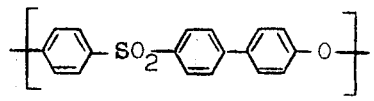

and a reduced viscosity of 0.44 (measured as a 1% $^w/_v$ solution in dimethyl formamide at 25°C).

EXAMPLE 7

4-hydroxybiphenyl (170.2 g; 1.00 mole), phosphoryl chloride (91.6 cm³; 1.00 mole), anhydrous aluminium chloride (1.33 g; 0.01 moles) and nitrobenzene were stirred together under nitrogen for 2.5 hours at 110°C whilst hydrogen chloride was evolved. To the resulting solution of biphenylyl-4-phosphorochloridate was added 4-chlorobenzenesulphonyl chloride (211.0 g; 1.00 mole) and anhydrous ferric chloride (12.0 g; 0.07 moles). The temperature of the reaction mixture was raised to 160°C and stirring was continued for a further 19 hours whilst further evolution of hydrogen chloride occurred. The reaction mixture was poured into methanol and the precipitate collected, dried and then stirred with refluxing alcoholic potassium hydroxide (46.2 g; 0.70 moles potassium hydroxide pellets in 175 cm³ ethanol) for 5 hours. Water was added to the mixture to give a clear solution which was acidified with concentrated hydrochloric acid. The precipitate which formed (83 g) was collected, dried and then recrystallised from dimethyl formamide and 1,2-dichloroethane/dimethyl sulphoxide mixture to constant melting point (270°–271°C). The resulting white crystalline solid had equivalent weight 345 and an infra-red spectrum virtually identical with an authentic sample of 4-(4-chlorophenylsulphonyl)-4'-hydroxybiphenyl.

A portion of the crystalline solid (3.45 g), aqueous potassium hydroxide (2.5 cm³ of a 4 N solution; 0.010 moles), and 1,1-dioxothiolan (20cm³), were placed in the flask of a rotary evaporator. The resulting mixture was evaporated to dryness under pressure of 140 N/m² (1 mm of mercury) and at a temperature rising to 260°C, and the yellow residue was then heated in vacuo for 30 minutes at between 280°C and 320°C. The polymeric reaction produce was dissolved in dimethyl formamide, precipitated into methanol and dried to yield polymer (1.9 g) of the following repeat units, which had reduced viscosity 0.52 (measured at 25°C on a solution in dimethyl formamide containing 1 g polymer in 100 cm³ of solution)

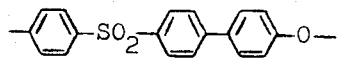

and a glass-to-rubber transition temperature of 270°C (measured by differential scanning calorimetry at a heating rate of 16° C/min). The polymer was compression moulded at 350°C, and also cast from concentrated dichloromethane solution, into films which could be creased repeatedly without fracture.

EXAMPLE 8

Bis-(4-biphenylyl) carbonate (16.7 g; 0.045 moles), 4-chlorobenzoyl chloride (17.3 g; 0.099 moles), nitrobenzene (50 cm³) and anhydrous ferric chloride (ca 1 g) were stirred together at 140°C under a stream of nitrogen for 3 hours during which time hydrogen chloride (0.093 moles) were evolved. Acetyl acetone (2 cm³) was added to the reaction mixture which was then allowed to cool.

Methanol (100 cm³) was added to the stirred mixture and the suspended solid was collected, washed with methanol and dried. The crude product (22.2 g) was recrystallised from a mixture of 1,2-dichloroethane (200 cm³) and dimethyl formamide (50 cm³) to yield a solid (18.2 g) having a melting point of 292°–294°C and infra-red and mass spectra consistent with the solid being bis-[4-(4-chlorobenzoyl)-biphenylyl] carbonate,

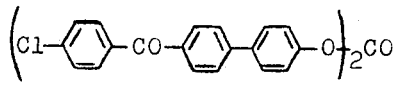

Bis-[4-(4-chlorobenzoyl)-biphenylyl] carbonate (17.3 g; 0.0269 moles), potassium hydroxide pellets (8.88 g; 0.1345 moles) and ethanol (66 cm³) were stirred together at reflux for 2 hours. The resulting orange-red paste was diluted with water (60 cm³) until a clear solution was obtained which was acidified whilst still hot by the addition of hydrochloric acid (6 N; 40 cm³). The mixture was cooled and the precipitate collected, washed with water and recrystallised from a mixture of ethanol (350 cm³) and methyl ethyl ketone (50 cm³) and then from 1,2-dichloroethane to yield a product having melting point 197.5°–198.5°C and having infra-red, n.m.r., and mass sectra, and elemental analysis (Found: carbon 73.7%, hydrogen 4.4%; Calculated: carbon 73.9%; hydrogen 4.3%) consistent with its being 4-(4-chlorobenzoyl)-4'-hydroxy biphenyl

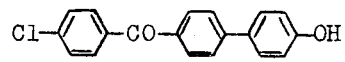

Bis-[4-(4-chlorobenzoyl)-biphenylyl] carbonate (16.1 g; 0.025 moles), bis-[4-(chlorobenzenesulphonyl)-biphenylyl] carbonate (17.9 g; 0.025 moles), dimethyl sulphoxide (125 cm³), diphenyl sulphone (125 g) and aqueous potassium hydroxide solution (22.94 g; 0.20 moles) were charged into a flask fitted with a stirrer, dry nitrogen, inlet and a vacuum distillation head, condenser and receiver. Water and then dimethyl sulphoxide were distilled from the reaction mixture as the temperature was raised to 180°C and the pressure reduced to 140 N/m² (1 mm of mercury). The pressure was maintained and the temperature raised to 215°C when diphenyl sulphone began to reflux. The pressure in the flask was returned to atmospheric by the admission of nitrogen and the reaction mixture heated to 220°C for 16 hours and at 265°C for a further 3 hours.

The stirred mixture was then allowed to cool to 150°C when dimethyl formamide (300 cm³) was added. The resulting slurry was poured into methanol (500 cm³) and the solid was collected, extracted with boiling methanol, water, water-acetone (1:1 $v/v$), and methanol-acetone, (1:1 $v/v$) and finally dried to yield a copolymer (25.8 g) consisting essentially of equal proportions of repeat units having the formula

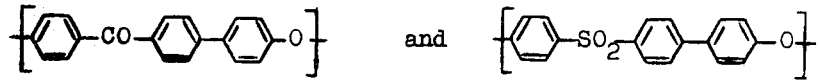

The copolymer had reduced viscosity of 1.26 as measured at 25°C in concentrated sulphuric acid 1% $w/v$) and was compression-moulded at 400°C into film which could be creased repeatedly without fracture.

Homopolymer consisting essentially of repeat units having the structure

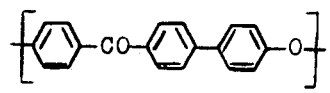

could be made by a similar method.

EXAMPLE 9

Bis-[4-(4-chlorobenzoyl)biphenylyl] carbonate (A) and the potassium salt (B) of 4-(4-chlorophenylsulphonyl) phenyl (as 1.3 mole solution in dimethyl sulphoxide) were charged (in amounts shown in Table 2) together with diphenyl sulphone (60 g), dimethyl sulphoxide (100 cm³ as indicated in Table 2) and aqueous potassium hydroxide solution (6.84 g; 0.06 moles) to a three-necked round bottomed flask (capacity 500 cm³) fitted with a stirrer, pocketed thermometer, dry nitrogen inlet, vacuum distillation head, condenser and receiver.

ture (7:2 $v/v$), boiling water, and boiling methanol/acetone acetone mixture (2:1 $v/v$), and dried at 120°C under reduced pressure. The polymers consisted of repeat units having the formulae

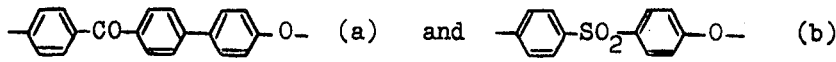

The polymers obtained by this procedure had the reduce viscosities (measured on 1% $w/v$ solutions at 25°C in (i) dimethyl formamide (ii) N-methylpyrrolidone and (iii) concentrated sulphuric acid), and crystalline

TABLE 2

| Copolymer Composition: Proportion of units (a) and (b) | | Carbonate (A) | | Potassium salt (B) | Volume of dimethyl sulphoxide added |
|---|---|---|---|---|---|
| (a) | (b) | (g) | Moles | Moles | cm³ |
| 0 | 1.00 | — | — | 0.050 | 0 |
| 0.90 | 0.90 | — | 0.006 | 0.044 | 100 |
| 0.33 | 0.67 | 6.43 | 0.010 | 0.040 | 100 |
| 0.46 | 0.54 | 9.65 | 0.015 | 0.035 | 100 |
| 0.67 | 0.33 | 16.08 | 0.025 | 0.025 | 100 |
| 0.75 | 0.25 | 19.29 | 0.030 | 0.020 | 100 |

*[Charged as a 1.3 molar solution in dimethyl sulphoxide]

The reactants were heated to 150°C whilst being stirred under atmospheric pressure and then the pressure was carefully reduced so that water and then dimethyl sulphoxide distilled. When distillation of dimethyl sulphoxide was complete, the temperature of the reaction mixture was raised to 240°C and the pressure returned to atmospheric by the admission of nitrogen into the flask when diphenyl sulphone started to reflux.

After polymerisation for 24 hours, the reaction mixture was cooled, removed from the flask and then macerated with methanol (ca. 1.5 dm³). The resulting material was extracted with boiling methanol/water mixture (7:2 $v/v$), boiling water, and boiling methanol/acetone melting points (Tm) shown in Table 3. The degree of crystallinity as shown by X-ray methods decreased progressively with increasing proportion of the sulphone component. The nature of the film compression moulded from the polymer is also indicated in Table 3.

TABLE 3

| Compolymer composition: Proportion of units (a) and (b) | | Reduced viscosity | | | Tm (°C) | Compression moulded film |
|---|---|---|---|---|---|---|
| (a) | (b) | (i) | (ii) | (III) | | |
| 0 | 1.00 | 0.55 | — | — | NC | Tough |
| 0.10 | 0.90 | — | — | 0.55 | NC | Tough |
| 0.33 | 0.67 | NS | — | 0.42 | 345–373 VB | Brittle |
| 0.46 | 0.54 | NS | — | 0.42 | 365 VB | Brittle |
| 0.67 | 0.33 | NS | NS | 0.30 | 366 | Brittle |
| 0.75 | 0.25 | NS | NS | 0.24 | 370 | Brittle |
| 1.00 | 0 | NS | NS | 0.51 | 418 | Brittle |

NS — not soluble or incompletely soluble
NC — not crystalline
VB — very broad (approximate beginning and end of melting recorded)

EXAMPLE 10

Bis-[4-(4-chlorobenzoyl)biphenylyl] carbonate (A) and bis[4-(4-chlorophenylsulphonyl)biphenylyl] carbonate (C) were charged (in amounts given in Table 4) together with dimethyl sulphoxide (125 cm³), diphenyl sulphone (125 g) and aqueous potassium hydroxide solution (22.49 g; 0.20 moles) to a round bottomed flask (capacity 500 cm³) as described in EXample 8.

TABLE 4

| Copolymer composition: Proportion of units (a) and (c) | | Carbonate (A) | | Carbonate (C) | | Polymerisation conditions | |
| --- | --- | --- | --- | --- | --- | --- | --- |
| (a) | (c) | g | Moles | g | Moles | Temp. (°C) | Time (hrs) |
| 0 | 1.00 | — | — | 35.75 | 0.0500 | 200 | 18 |
| 0.10 | 0.90 | 3.22 | 0.0050 | 32.16 | 0.0450 | 200 | 19 |
| 0.20 | 0.80 | 6.43 | 0.0100 | 28.60 | 0.0400 | 200 | 18 |
| 0.33 | 0.67 | 10.61 | 0.0165 | 23.95 | 0.0335 | 200 | 18 |
| 0.40 | 0.60 | 12.86 | 0.0200 | 21.45 | 0.0300 | 200 | 17 |
| 0.50 | 0.50 | 16.10 | 0.0250 | 17.90 | 0.0250 | 220–260 | 19 |
| 0.67 | 0.33 | 21.54 | 0.0335 | 11.80 | 0.0165 | 200–260 | 21 |
| 0.80 | 0.20 | 25.72 | 0.0400 | 7.15 | 0.0100 | 240 | 18 |
| 1.00 | 0 | 32.2 | 0.0500 | — | — | 325 | 4 |

The reactants were heated to 150°C whilst being stirred under atmospheric pressure and then the pressure was carefully reduced so that water and then dimethyl sulphoxide distilled. When distillation of dimethyl sulphoxide was complete, the temperature of the reaction mixture was raised to the polymerisation temperature given in Table 4, and the pressure returned to atmospheric by the admission of nitrogen into the flask when the diphenyl sulphone started to reflux.

When the polymerisation was complete, the reaction mixture was cooled, removed from the flask and then mascerated with methanol (ca. 1.5 dm³). The resulting material was extracted with boiling methanol-water (7:2 $v/v$), boiling water and boiling methanol-acetone (2:1 $v/v$) and dried at 120°C under reduced pressure. The polymers consisted of repeating units having the formulae

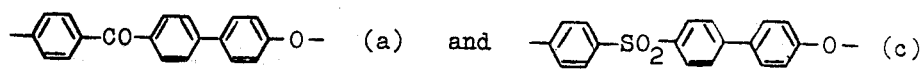

The polymers obtained by this procedure had the reduced viscosities (measured on 1% $v/v$ solutions at 25°C in (i) dimethyl formamide (ii) N-methyl pyrrolidone and (iii) concentrated sulphuric acid, glass-to-rubber transition temperature (Tg), and crystalline melting points (Tm) shown in Table 5. The degree of crystallinity as shown by X-ray methods decreased with increasing proportion of the sulphone component. The nature of the film compression moulded from the polymers is also indicated in Table 5.

TABLE 5

| Copolymer composition: Proportion of units (a) and (c) | | Reduced viscosity | | | Tg (°C) | Tm (°C) | Compression moulded film |
| --- | --- | --- | --- | --- | --- | --- | --- |
| (a) | (c) | (i) | (ii) | (iii) | | | |
| 0 | 1.00 | 1.56 | — | — | 275 | NC | Tough |
| 0.10 | 0.90 | 0.51 | — | — | 268 | NC | Tough |
| 0.20 | 0.80 | 0.57 | 0.88 | 1.13 | 259 | NC | Tough |
| 0.33 | 0.67 | — | 1.01 | 1.45 | 253 | 320–360 VB | Tough |
| 0.40 | 0.60 | NS | 0.77 | 1.10 | 239 | 320–360 VB | Tough |
| 0.50 | 0.50 | NS | NS | 1.26 | 234 | 365 | Tough |
| 0.67 | 0.33 | NS | NS | 0.75 | 220 | 390 | Tough |
| 0.80 | 0.20 | NS | NS | 0.34 | ND | 396 | Brittle |
| 1.00 | 0 | NS | NS | 0.51 | ND | 418 | Brittle |

ND — not detected owing to crystallinity
NS — not soluble or not completely soluble
NC — not crystalline
VB — very broad (approximate beginning and end of melting recorded)

We claim:

1. A halophenol of the formula

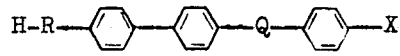

where X is a halogen atom, R is —O— or —S— and Q is —SO₂—, or an alkali metal salt thereof wherein X is halogen.

2. A halophenol according to claim 1 of the formula

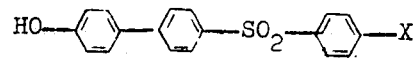

or an alkali metal salt thereof wherein X is halogen.

3. A halophenol according to claim 1 wherein Q is —SO₂— and X is chlorine, bromine or fluorine.

* * * * *